INVENTORS
Herbert A. Leflet, Jr. and
BY David M. Wampler
Nobbe & Swope
ATTORNEYS

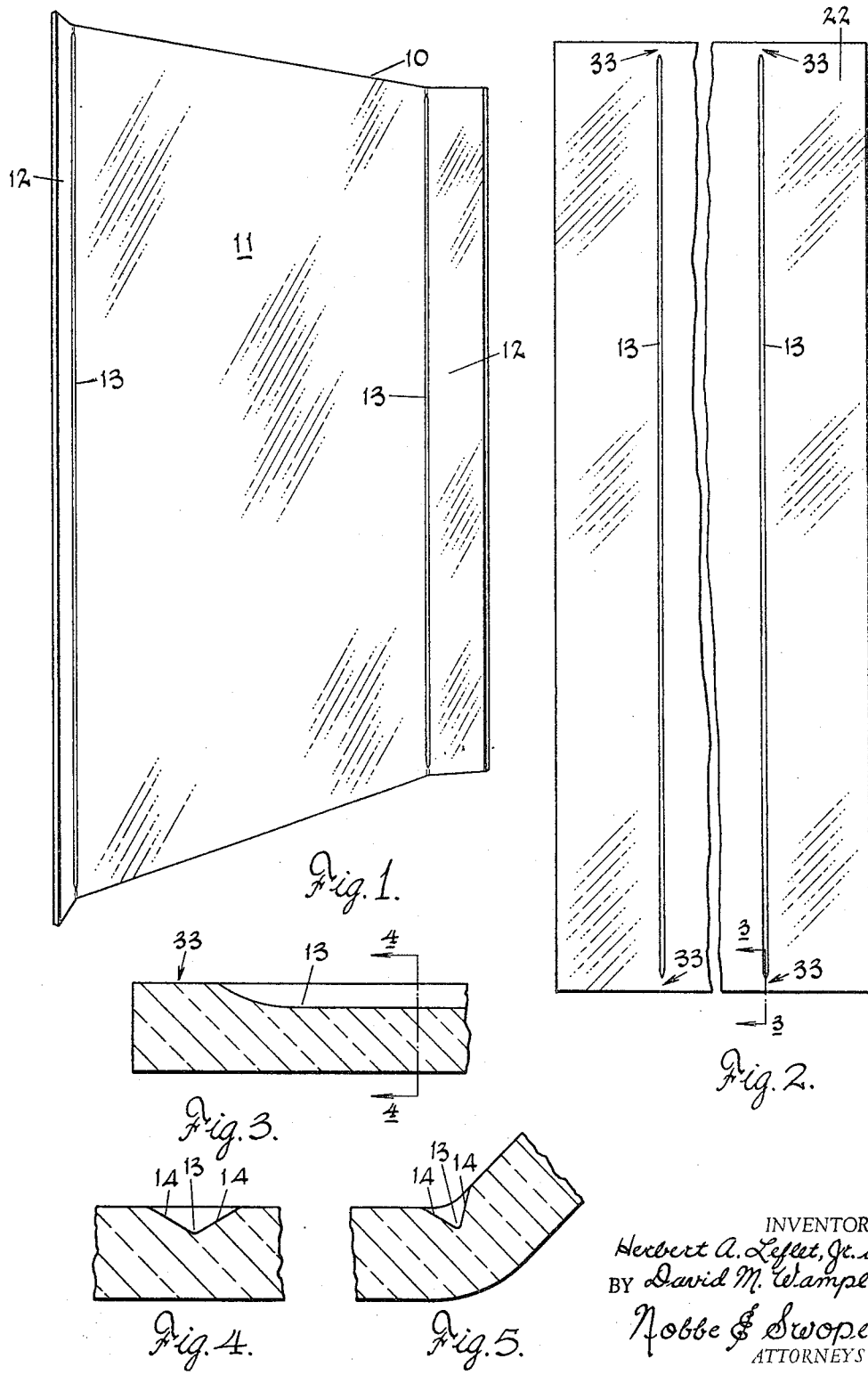

United States Patent Office 3,281,227
Patented Oct. 25, 1966

3,281,227
METHOD OF BENDING GLASS SHEETS
Herbert A. Leflet, Jr., and David M. Wampler, Toledo, Ohio, assignors to Libbey-Owens-Ford Glass Company, Toledo, Ohio, a corporation of Ohio
Filed Feb. 14, 1966, Ser. No. 527,181
5 Claims. (Cl. 65—62)

The present invention relates to an improved method of bending sheets of glass to relatively sharp angles. The invention is more particularly concerned with producing architectural glazing units such as would be used in modern commercial structures.

By way of background, in recent years the trend in architectural design and construction of buildings has been to incorporate increasingly more glass in the walls of the structure as a substitute for the various other building materials. In these buildings, substantially the entire outer wall is formed of large, flat sheets or plates of glass so as to provide expansive window areas in the building.

As a variation of this general design, it has been proposed to construct a building in which the outer walls are made up of a series of bay windows which include a large flat sheet spaced outwardly from the frame of the building and angularly disposed flat glass sheets extending inwardly from the opposite vertical sides of the first sheet toward the frame of the building. When these windows are arranged substantially side by side along the entire outer wall, they provide a more or less sculptured facade whereby the building as a whole has a very pleasing appearance.

When such glazing units are constructed by following ordinary glazing techniques, the structure is somewhat complicated since glazing bars are required at each of the intersections of the glass sheets from which the unit is formed. These glazing bars are very noticeable and tend to distract from the over-all appearance of the building and to interfere with vision through the window unit. To eliminate this disadvantage, the present invention proposes forming the bay window structure from a single sheet of glass by bending the sheets along substantially straight bend lines spaced inwardly of the outer edges of the sheets thereby to form a comparatively large flat central portion and oppositely disposed flat wing portions projecting at a sharp angle from the central portion.

In bending sheets to produce the structure described above, it is desirable that the central portion and the wing portions remain substantially flat and that the only bend imparted to the sheet be along the straight bend lines joining these portions. Further, it is desirable that these bends be accomplished with a minimum of distortion along the bend line, which distortion could result from stresses being imparted to the sheets due to the sharp bend. To these ends, grooves extending along the bend lines are formed in at least one surface of the sheet. These grooves establish lines of weakened resistance to bending rendering it possible to effect bending along this line without causing any other portion of the sheet to bend and, in addition, permits the sheet to bend without imparting stresses of high magnitude to the glass in the vicinity of the bend.

It has now been discovered that, while the grooves permit satisfactory bending of the sheet to produce acceptable glazing units of this nature, they also constitute a source of weakness in the sheet rendering it more susceptible to damage due to various forces which may be exerted against the sheet throughout its service life. These forces or stresses could arise from shifting of the structural elements supporting the units as a result of settling of the building or from wind loads on the units.

One aim of the present invention is to provide an improved method of bending a sheet of glass to relatively sharp angles without decreasing the physical strength of the bent sheet.

Another object is to accomplish the foregoing by terminating the groove or line of weakened resistance inwardly of the edges of the sheet.

Other objects and advantages of the invention will become more apparent during the course of the following description when taken in connection with the accompanying drawings.

In the drawings, wherein like numerals are employed to designate like parts throughout the same:

FIG. 1 is a perspective view of a completed glazing unit formed in accordance with the present invention;

FIG. 2 is a fragmentary plan view of a sheet before being bent;

FIG. 3 is a fragmentary sectional view taken along line 3—3 in FIG. 2;

FIG. 4 is a cross sectional view taken along line 4—4 in FIG. 3;

FIG. 5 is a sectional view similar to FIG. 4 but showing the sheet after being bent.

Figure 6:
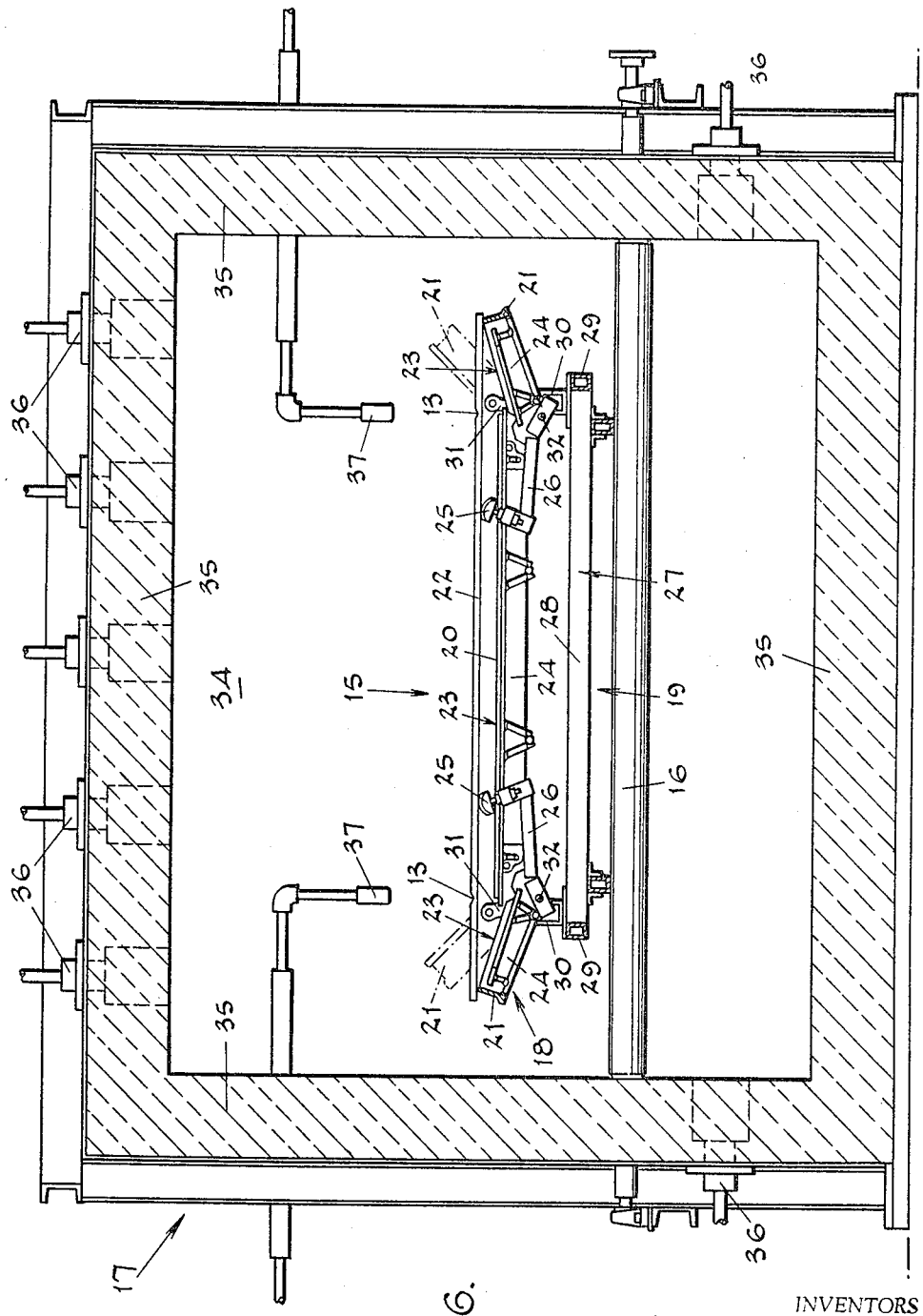
FIG. 6 is a transverse vertical sectional view of a bending apparatus for carrying out the method of the invention.

While the present invention could be practiced in producing a variety of glass articles which require bending sheets to relatively sharp angles, for purposes of illustration, FIG. 1 illustrates a glazing unit 10 of the bay window type designed for use on a modern office building or the like and produced by the method of the present invention. The unit 10 would usually be of relatively large size and formed from a large sheet of glass having a thickness, for example, of three-eighths inch or better. However, smaller units formed from thinner sheets could be produced in accordance with the invention. The unit 10 illustrated has a center portion 11 which is preferably flat and two oppositely disposed wing portions 12 which are also flat and bent at a comparatively sharp angle, for example, 45° or more, from the center portion along straight lines extending from one edge to the opposite edge of the sheet.

In producing the glazing unit 10, substantially straight grooves 13 are provided in a surface of a flat sheet of glass to establish the lines along which the sheet is to be bent. As best shown in FIG. 4, the grooves 13 are substantially V-shaped and are relatively shallow in depth with comparatively wide angularly disposed side walls 14. This groove may be formed by any well-known glass cutting or abrading operation such as by means of a suitable angled grinding wheel.

The depth to which the grooves 13 are formed is dependent upon the thickness of the glass sheet and the angle to which it is to be bent. By way of example, in bending glass sheets approximately three-eighths inch thick, the depth of the grooves should range from .090 inch to approximately .150 inch in the production of an optically clear bend to an angle approaching 90°.

The provision of the grooves in the surface of the sheets establishes lines of weakened resistance along which the sheet will bend.

The size and shape of the groove also contribute to the satisfactory bending of the sheet to relatively sharp angles without creating optical distortion in the sheet. In this regard, it has been found that when sheets are bent to relatively sharp angles, the glass along the bend line at the inner surface of the bend is placed in compression and the glass at the opposite or outer surface is stretched and placed in tension. These stresses, particularly the tensile stress, cause linear areas of distortion along the line of the bend with subsequent loss of optical clarity in or through the glass. This optical distortion is minimized, or even entirely avoided, by removing glass from the inner surface of the sheet in the area of the bend which reduces the magnitude of the compressive stress in the glass at the inner surface of the bend and thereby reduces the magnitude of the tensile stress at the outer surface of the bend. The angle formed by the side walls 14 of the groove 13, which together with the depth of the grooves depend upon the amount of glass to be removed from the sheet, depends upon the angle to which the glass sheet is to be bent.

After the grooves 14 have been formed in the flat glass sheet, as best shown in FIG. 2, the latter is placed on a bending apparatus 15 and moved by a conveying means such as a roller conveyor 16 through a bending furnace 17 (FIG. 6) wherein the sheet is heated to an elevated temperature and bent along the grooves. The bending apparatus 15 includes an outline type mold 18 carried by a support rack 19. The mold 18 comprises a center section 20 and oppositely disposed end sections 21 movable relative to each other between an open position operable to receive a flat glass sheet 22 to be bent (shown in full line in FIG. 6) and a closed position wherein shaping surfaces 23 formed on the sections define the desired curvature of the finished glass sheets (shown in broken line in FIG. 6). The various sections are formed from shaping rails 24 arranged to conform in plane to the outline configuration of the sheet and having the shaping surfaces 23 formed on the uppermost edges thereof.

To aid in supporting a flat glass sheet 22 on the mold 18, support elements 25 are provided to engage and support the centermost portions of the sheet, which elements are carried on arms 26 fixed to the end sections so that the support moves from a raised position above the shaping surface and in the plane of the flat glass sheet to a lowered position disposed below the shaping surface as the mold moves into the closed position.

The rack 19 supporting the mold includes a substantially rectangular base frame 27 having longitudinally disposed side rails 28 joined at their opposite ends by transversely disposed end rails 29. Adjacent each corner of the base are vertically disposed posts 30 having links 31 pivoted to their upper ends. The lowermost ends of the links receive rods 32 extending beneath and attached to the mold sections which rods bodily support the mold on the rack.

As the sheets supported on the mold are heated to an elevated temperature approaching the softening point of the glass, the sheet loses its rigidity and sags downwardly under the influence of gravity toward the shaping surfaces 23 of the mold and, at the same time, the mold sections 20 and 21 swing toward the mold closed position. Since the sheet offers the least resistance to the forces exerted by gravity and by the mold along the grooves 13, bending of the sheet is confined to the straight bend lines defined by the grooves which results in the unit illustrated in FIG. 1.

Since the glass along the inner surface of the bend is removed as shown in FIG. 4, upon bending of the sheet, less glass is displaced along the bend line and the side walls of the grooves 13 are free to move toward each other (FIG. 5). The bending of the sheet may then be accomplished without imparting compressive stresses of high magnitude along the inner surface of the bend which would result in tensile stresses of high magnitude along the outer surface of the bend. The distortion which accompanies tensile stress is thus avoided. Substantially the only optical distortion in the finished unit comprises the groove itself and this appears as a straight line in the finished unit and thus does not distract from the appearance of the unit.

The glass sheet used in glazing units, especially in large size glazing units such as would be used on a modern office building or the like, are subject to being stressed during their service life, particularly from wind loads exerted against the sheets and to some extent from shifting of the structural components of the building. Usually these stresses are within the elastic limit of the glass and thus do not result in damage or breakage of the unit. However, when sheets are weakened along the line of the bend to form a bay window type unit of the type described, they become more susceptible to damage as a result of the stresses imparted to the sheets by wind loads and the like. Even if these stresses are within the elastic limit of the glass sheet, as a whole, they often exceed this limit along the grooves resulting in the sheet breaking along the line of the grooves thereby destroying the unit.

It has now been discovered, and the present invention is based upon this discovery, that the strength of units of this type may be materially increased, while maintaining the advantages as regards bending resulting from the procedure of grooving the sheet, by terminating the grooves inwardly of the marginal edges of the sheets. Thus it has been found that if a relatively small area of the sheet along the bend line and adjacent the marginal edges of the sheet, is left ungrooved and thus unweakened, the unit, as a whole, will withstand stresses which would destroy a unit having grooves extending from one edge of the sheet to the opposite edge.

Thus, in accordance with the method of this invention, the grooves which constitute the line of weakened resistance about which the sheet to be bent are formed in the surface of the sheet along the bend lines but are terminated inwardly of the opposite edges of the sheet so as to leave a comparatively small ungrooved area 33 adjacent these edges. Since the ungrooved area is small, it is relatively unnoticeable in the finished unit and, in some instances, even hidden by the components mounting the unit on the building. Further since the areas are small, they do not hamper the bending of the sheet along the desired lines.

The size of the area 33 depends somewhat on the thickness of the sheet and the size of the groove formed therein. By way of example, it has been found that when bending three-eighths inch thick sheets by first forming .090 inch to .150 inch deep grooves in the surface thereof, a stronger unit will result if an ungrooved area extending three-eighths inch from the edges of the sheet is provided.

In carrying out the method of the invention, a groove is ground or otherwise formed in the surface of a sheet to be bent along the line of the intended bend with the groove terminating adjacent to but inwardly of the opposite edges of the sheet. The sheet is then supported horizontally on the bending mold 18, which, at this time, is in an open position, and moved through the furnace 17. Herein, the furnace 17 comprises a heating chamber 34 defined by refractory walls 35 and heated by suitable devices 36 mounted in the walls. The heating devices 36 are controlled to progressively heat the sheet to the proper bending temperature without subjecting the sheet to thermal shock.

To further aid in bending the sheet along the desired line, the glass along the area of the groove is heated to a relatively higher temperature than the areas on the opposite sides of the groove. This is accomplished by utilizing gas burners 37 or similar means projecting through the side walls of the furnace and positioned directly over the grooves so that heating flames are directed downwardly therefrom against the groove. This serves to raise the temperature of the area of the sheet along the groove at a more rapid rate than adjacent areas so that the glass long the grooves reaches the softening point and bends before the centermost portion or wing portions of the sheet have become sufficiently softened to sag below the desired substantially flat plane. These burners 37 may be operated to serve an additional purpose; that of firepolishing the side walls of the groove thereby removing any surface marks left during formation of the groove.

As the glass becomes softened along the line of the groove, the mold moves to the closed position and the glass bends along the line defined by the groove to a relatively sharp angle with the wing sections then lying in angularly disposed planes relative to the center portion. During such bending, the walls of the groove are folded toward one another and appear as to crease in the inner surface of the sheet.

While in the process depicted and described herein, the sheet is bent so that the grooves 13 are in the innermost surfaces of the bent sheet, it will be appreciated that the sheet could be bent in accordance with the invention in such a manner that the groove would be in the outermost surface of the finished unit. The groove acts as a line of weakened resistance regardless of which surface of the sheet is grooved and, since glass is removed in either arrangement, the magnitude of the stress created by bending the sheet would be small as compared to those created when an ungrooved sheet is bent to the same angle. Further, the method of the invention could be practiced to bend sheets at sharp angles to various different configurations having one or a number of sharp bends.

It is to be understood that the forms of the invention herewith described are to be taken as illustrative embodiments only of the same, and that various procedural changes may be resorted to without departing from the spirit of the invention.

We claim:
1. A method of bending glass sheets to relatively sharp angles, comprising forming a groove in a surface of a surface of a flat sheet of glass to be bent, which groove extends along a substantially straight line across the sheet and terminates inwardly of the opposite marginal edges thereof, supporting the flat sheet of glass horizontally on a bending mold, heating said sheet to bending temperature to cause the sheet to sag under the influence of gravity along said groove into conformity with shaping surfaces on said mold.

2. A method of bending glass sheets to relatively sharp angles as defined by claim 1, in which the area of the sheet along the groove is heated to bending temperature more rapidly than the other areas of the sheet to effect initial bending of the sheet along said groove.

3. A method of bending glass sheets to relatively sharp angles as defined in claim 1, in which the grooved portion of the sheet is heated to a relatively higher temperature than the remaining portions of the sheet.

4. A method of bending glass sheets to relatively sharp angles as defined in claim 1, in which the area of the sheet along the groove is heated by concentrating flames of combustible gas onto said groove thereby to fire-polish the glass along said groove.

5. A method of bending glass sheets to relatively sharp angles as defined in claim 1, in which the sheet is supported on the mold with the groove in its upper surface, and in which the groove is formed with outwardly divergent side walls.

References Cited by the Examiner
UNITED STATES PATENTS
3,241,936  3/1966  Leflet et al. _____ 65—62
FOREIGN PATENTS
155,077  11/1938  Austria.

DONALL H. SYLVESTER, *Primary Examiner.*
A. D. KELLOGG, *Assistant Examiner.*

UNITED STATES PATENT OFFICE
CERTIFICATE OF CORRECTION

Patent No. 3,281,227                          October 25, 1966

Herbert A. Leflet, Jr., et al.

It is hereby certified that error appears in the above numbered patent requiring correction and that the said Letters Patent should read as corrected below.

Column 5, lines 27 and 28, strike out "of a surface".

Signed and sealed this 15th day of August 1967.

(SEAL)
Attest:

Edward M. Fletcher, Jr.                          EDWARD J. BRENNER
Attesting Officer                               Commissioner of Patents